¹

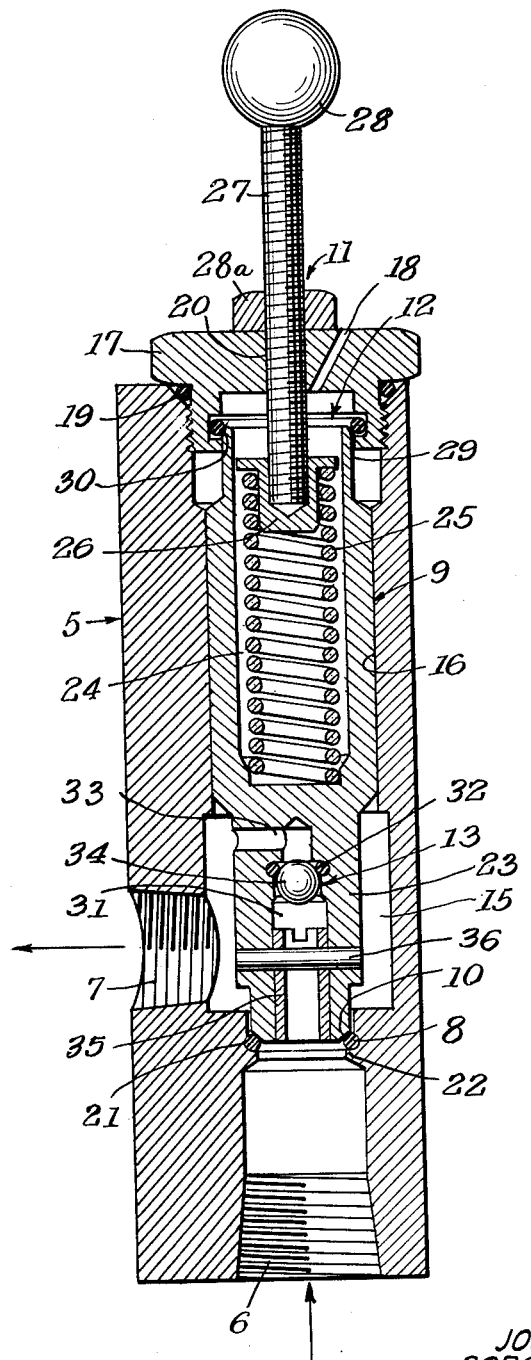

United States Patent Office 3,152,606
Patented Oct. 13, 1964

3,152,606
SEQUENCE AIR VALVE
John Vedder, Torrance, and Borgert Vedder, Fullerton, Calif. (both of 14032 S. Avalon Blvd., Los Angeles, Calif.)
Filed May 1, 1963, Ser. No. 277,163
2 Claims. (Cl. 137—493.2)

This invention relates to a sequence air valve and has for an object to provide a relief valve that, when closing from a pressure-actuated open position, relieves trapped air on the outlet side of the valve. Air valves in a sequence-operation installation may trap operating pressure on the outlet side, the present valve automatically acting to by-pass or relieve such pressure to restore the installation to the same pressure conditions after each sequential operation of the valve. This application is a continuation-in-part of our pending application on Air Valve With Relief By-Pass, Serial No. 174,096, filed February 19, 1962, now abandoned.

Inasmuch as valves of the present nature may be required to operate over long periods of time and operate best when the valve conditions are the same during the sequence of operations, a sequence air valve should be as foolproof as possible to insure such uniformity of operation. Another object of the invention is to provide a valve, as characterized, that is substantially friction free, especially with respect to the air-relieving portions thereof, and, therefore, affords uniformity of the sequential operations.

A further object of the invention is to provide a sequential air valve embodying means that returns the valve to the same operating position, after operation thereof, to insure uniformity of operation at each sequence thereof.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

The figure is a longitudinal sectional view of a sequence air valve according to the present invention and shown in closed position.

The valve that is illustrated comprises, generally, a body 5 having an air inlet 6 and an air outlet 7, a resilient valve seat 8 in the body and which when closed stops flow between the inlet and outlet, a poppet 9 slidably mounted in the body and provided with a conical end 10 for engaging said valve seat 8, adjustable means 11 to bias the poppet 9 to seat-engaging position, means 12 to seal the end of the poppet 9 opposite said conical end 10, and a by-passing relief valve 13 embodied in the poppet for automatically relieving air pressure on the outlet side of the valve to the inlet side thereof when the poppet end is in closing engagement with the seat 8 to equalize the pressure between the inlet 6 and the outlet 7.

The body 5 is formed with a chamber 15 into which the outlet 7 opens and on the downstream side of the valve seat 8, a cylinder bore 16 for the poppet 9 and forming an extension of said chamber, a closure fitting 17 to close the end of the body beyond the cylinder bore 16, and an air vent port 18 in said fitting for releasing pressure in the bore 16 that may accumulate due to leakage past the poppet 9. The fitting 17 is threadedly connected to the body 5, a sealing ring 19 being provided between the body and fitting. An axial threaded bore 20 is provided in the fitting. In this case, the inlet 6 is disposed on the axis of the body in the end opposite the fitting 17, and the outlet 7 extends radially from the chamber 15.

The resilient valve seat 8 comprises an O-ring that is fitted in an annular groove 21, an annular shoulder 22 being provided as a support for the upstream side of the ring, the poppet end 10, under bias of the means 11, forcing said end in a direction to compress the ring 8 against said shoulder.

The poppet 9 has a sliding fit in the cylinder bore 16 and is provided with a diametrally reduced portion 23 in which the by-passing relief valve 13 and on the end of which the conical end 10 are provided. The main body of the poppet is provided with a blind axial bore 24 that opens toward the fitting 17.

The adjustable means 11 to vary the force of the closing bias on the poppet is shown as a compression spring 25 disposed in the bore 24, a spring follower 26 engaged with the end of the spring 25 that is directed away from the blind end of the bore 24, a threaded stem 27 engaged with and extending through the threaded bore 20 and connected to the follower 26 at one end, manipulating knob 28 on the other and outer end of said stem 27 for turning said stem and, thereby, varying the biasing force of spring 25 on the poppet 9, and a jamb nut 28a on said stem and engaged with the fitting 17 to lock the adjustment. Said biasing force is regulated according to the pressure of air in the inlet 6 to allow the poppet to move under said pressure and open the valve to flow of air from the inlet 6 to the outlet 7.

When the pressure in the inlet is shut off or is reduced, the valve poppet not only closes under bias of the spring 25 but, also, the sealing ring 12 produces a fast-acting snap force that is effective at the instant that the poppet end 10 engages the valve ring 8 so that, thereby, at each valve-closing operation, the same amount of closing force is applied and the poppet is returned to its proper position ready for the next cycle of operation. The poppet end 29 is tubular and is slid through the O-ring 12 during opening movement of the poppet to seal against leakage around the poppet to the air vent port 18. Upon return of the poppet to closing position, said poppet end 29, due to its chamfer 30, pops out of the ring 12 and produces the mentioned seating return of the poppet against the ring seat 8.

The by-passing relief valve 13 is shown as a bore 31 in the end portion 23 of the poppet and open to the inlet 6 of the valve, an O-ring 32 around said bore 31 and constituting a resilient valve seat, a port 33 beyond said seat 32 and opening into the chamber 15, a valve ball 34 that checks flow to the outlet 7, when the ball is held against said seat by inlet pressure.

The bore 31 is fitted with a sleeve 35 that holds the ball 34 captive, the same being held in place by a cross pin 36. Said sleeve is notched to allow air flow past the ball when the same is engaged with the end of the sleeve.

It will be seen that the pressure of the flow from inlet 6 is effective on the poppet to open the valve because the check action of the ball 34 is exactly the same as if the poppet portion 23 were solid. Therefore, the valve opens in the usual way against the bias of the spring 25 to admit pressure flow to the outlet 7. When the pressure in the inlet 6 drops or is shut off, the spring 25 moves the poppet to closing position. During such movement, the ball 34 remains seated against the O-ring 32 until such pressure is considerably reduced. Then, as the poppet end 10 seats on the ring 8, the trapped pressure in the outlet 7 unseats the ball 34, at any time that the pressure in the inlet falls below said trapped pressure. Hence, the pressures at the inlet and outlet become equalized. Since the ball is provided without spring bias, pressures as low as four ounces will equalize, as above, regardless whether the valve is upright as shown or is disposed on its side. When inlet pressure is again applied, the ball will be seated against the ring 32, first, then the poppet will open.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A sequence air valve comprising:
    (a) a body having an axial inlet and a lateral outlet,
    (b) a resilient valve ring carried by the body between said inlet and outlet,
    (c) a spring-biased poppet having a conical end directed toward said ring to seal thereagainst to close air flow from the inlet to the outlet,
    (d) a by-passing relief valve in the poppet that closes to flow of inlet air through the poppet to the outlet and automatically and freely opens to air flow from the outlet through the poppet to the inlet while the poppet is in flow-stopping engagement with said resilient valve ring,
    (e) resilient ring means carried by the valve body to seal around the end of the poppet that is opposite the mentioned conical end of the poppet, said opposite poppet end moving through said sealing member when moved to open position by pressure of inlet air, and
    (f) said opposite end of the poppet being provided with an end chamfer which, when the same is withdrawn during seating of the poppet, pops out of the resilient ring to firmly seat the poppet on the resilient valve ring.

2. A sequence air valve according to claim 1 in which the end of the poppet that moves through the resilient ring is tubular to have both sealing and sliding engagement with said resilient ring.

References Cited in the file of this patent

UNITED STATES PATENTS

| | | |
|---|---|---|
| 807,269 | Hildebrand | Dec. 12, 1905 |
| 2,485,504 | Morgan | Oct. 18, 1949 |
| 2,634,947 | Gardner | Apr. 14, 1953 |
| 2,644,480 | Earle et al. | July 7, 1953 |
| 2,959,188 | Kepner | Nov. 8, 1960 |